April 26, 1949.  F. M. DRESSEL  2,468,360
NONSIPHONING TRAP
Filed Oct. 24, 1945
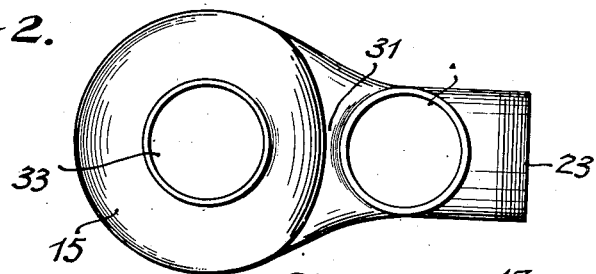
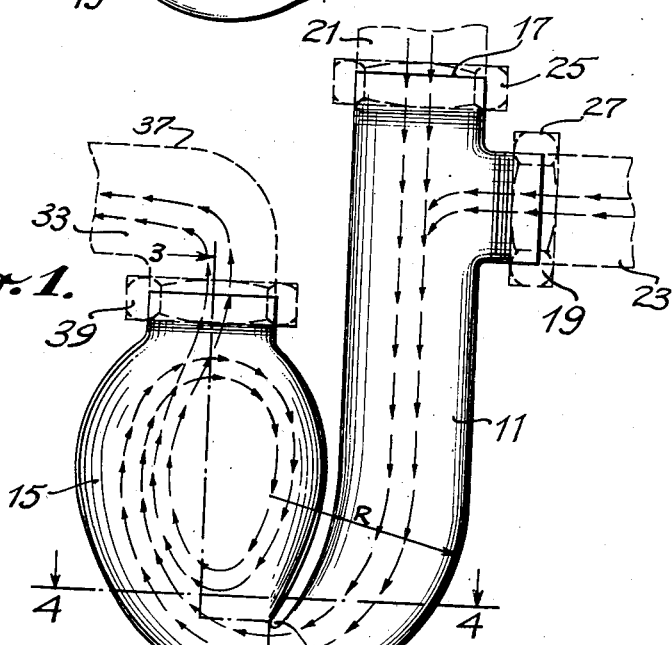
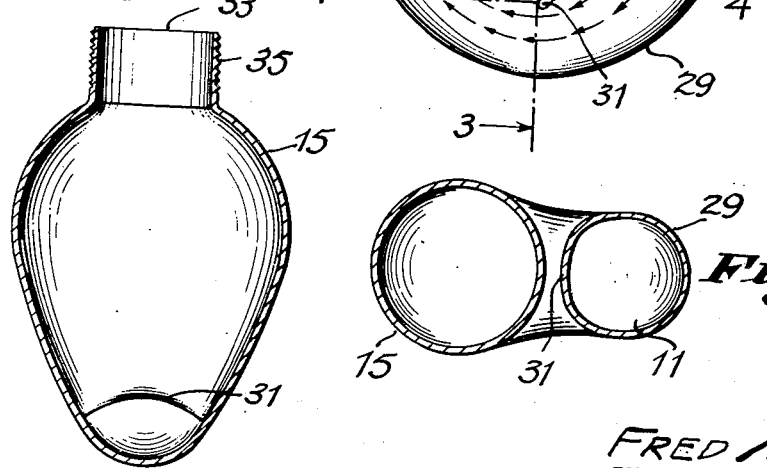
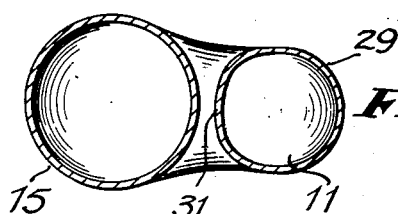
INVENTOR
FRED M. DRESSEL
BY
Samuel B. Smith
ATTORNEY Patented Apr. 26, 1949

2,468,360

UNITED STATES PATENT OFFICE 2,468,360

NONSIPHONING TRAP

Fred M. Dressel, Kingston, N. Y.

Application October 24, 1945, Serial No. 624,193

3 Claims. (Cl. 182—7)

This invention relates to a non-siphoning trap arranged to be connected to drain or dispose of liquid waste within a plumbing fixture or other similar type of supply container and to drain such liquid to a final suitable outlet.

In the prior art various forms of traps have been proposed and utilized for such purpose. Usually these traps have been formed by making a U or S bend in a pipe leading from the outlet of the plumbing fixture or other container to the final outlet pipe which leads, for example, to a sewer. The prior art traps are for the purpose of precluding noxious gases and vermin, for instance, from entering from the final drain through the outlet and the drain pipe and thence into the outer region surrounding the fixture or into the atmosphere of the room or space within which the fixture is located. In the majority of such prior art traps it has been customary to provide a clean-out plug in the bottom of the U or S bend. Such clean-out plugs are made removable. They are provided for the purpose of permitting the trap to be cleaned of any collected foreign substances which normally adhere to the trap walls and also collect in the lowermost portion of the trap, which often prevent the proper liquid flow through and from the trap.

The most common forms of prior art traps generally require a very considerable amount of water or other liquid in the lowermost section of the U or S bend if the liquid or water seal is to be maintained in an unbroken state. Thus, with infrequent use of the fixture, and the consequent limited liquid flow therethrough, the water or other liquid which forms the trap seal frequently evaporates with the disastrous result that the bend section actually does not provide the necessary seal. At such times there may be substantially a direct passage to the final sewer outlet so that poisonous or at least noxious gases, and even vermin in some instances, frequently pass the trap unit to manifest themselves and become evident in the region within which the main fixture is located. At the same time the prior art traps were usually of such a variety that a siphoning action often took place after adequate draining of the fixture or supply source. This factor gives rise to another reason why the water or liquid seal would become broken and the air-lock at the bottom of the outlet bend would not be maintained.

By the present invention it is proposed to provide a non-siphoning form of gravity feed system utilizing a trap structure wherein the bottom portion is designed to be completely self-cleansing and, at the same time, of such a form that siphoning action cannot occur, with draining, to such an extent that the liquid seal will be permanently broken after the liquid is drained from the supply. To this end the inlet tube, pipe or conduit is connected into the main trap body, chamber or reservoir section of the trap in such a way that the contour of the inlet conduit or pipe merges with that of the main trap body along the outer path of flow of the draining liquid. The inner surface of the inlet conduit or pipe is then bent or shaped to merge into the inner edge of the main trap reservoir in such a manner as to form somewhat of a constriction or dip portion of the trap which has the effect of substantially separating the inlet section from the main reservoir section. In the preferred construction, the main trap body or reservoir member is of substantially bulbous or pear-shaped configuration longitudinally with the small constricted cross-sectional portion corresponding substantially to the frustrum thereof made to merge into the inlet conduit in such a manner as to maintain an even and uniform flow and contour of the trap at all surface areas thereof.

The upper or most rounded end of the bulbous or pear-shaped section which forms the main trap body, chamber or reservoir is also provided with a constriction forming an outlet or opening to which an outlet drain tube, pipe or conduit connects to feed the outgoing liquid to be drained into a final drain or sewer. The main trap body or reservoir, while being of substantially bulbous or pear-shaped longitudinally, is of substantially circular cross-section (shown more particularly by Fig. 2) at all planes between the final outlet constriction and the portion at its lower section opposite that whereat the dip is formed by merging the inlet pipe or tube and the main reservoir section. With this construction the entering liquid which flows into the main trap body or reservoir through the trap intake conduit, tube or pipe acquires a relatively high velocity as it flows past the lowermost portion of the intake and past the dip portion of the trap to enter into the frusto-conical or pear-shaped section of the main body member. By reason of the streamlining of the inlet and reservoir portions the incoming liquid tends to follow along the contour of the outermost sides or surfaces of the reservoir unit and thus tends to create a circulatory, vortex or whirling effect within the main reservoir chamber. The axis about which such whirling takes place is substantially parallel to the plane of constriction formed by merging of the inlet conduit and the reservoir trap section. This whirling or circulating effect causes the entering liquid to wash the trap walls by erosion to such an extent that it is not possible for foreign matter permanently to collect upon and adhere to the inner walls of the trap.

At the same time the rapid flow or whirl of the liquid along the outer edge of the main trap reservoir causes the circulating path of flow to continue until there is a circulating flow within the complete unit. This motional flow continues with the entrance of more and more liquid into the reservoir prior to the overflow leaving the main reservoir body through the final drain tube. Such foreign substances as are usually collected are washed from the trap walls, or such substances as enter into the trap from the external fixture are then caused to pass outwardly from the unit and into the final overflow or drain. When the supply reservoir becomes substantially empty an air bubble may be considered to pass through the inlet conduit and to enter into the main reservoir section. The volume of the reservoir section is made large relative to that of the inlet section so that with the entrance of the air bubble (or other fluid), usually at atmospheric pressure, into the reservoir the circulation or whirling of the liquid therein contained is arrested or interrupted. The amount of liquid contained within the reservoir section of the unit then tends to flow by gravity in the reverse direction from that followed in passing to the final drain. In so reversing its flow direction the liquid falls back into the constricted section where the inlet conduit and the main reservoir merge. The desired liquid seal is thus established.

With the foregoing generalized statements in mind it will at once become apparent that one of the primary objects of this invention is that of providing a trap or plumbing fixture which will continually maintain itself clean and free of all foreign substances or dirt and which will, at the same time, be of a non-siphoning variety with emptying of the supply container or vessel, so that noxious gases, bugs, vermin and the like cannot pass from the final outlet or the outlet sewer through and beyond the trap unit.

A further object of the invention is that of providing a trap unit which requires no external cleanout plug to provide for cleaning. In this way the trap unit as a whole may be more readily and more cheaply cast without in any way losing any of the desirable features of the more commonly used types of traps now for sale on the open market.

Another object of the invention is to provide a non-siphoning form of self cleaning trap which is simple and convenient to manufacture, which may readily be formed in a single casting operation, which does not require any additional components other than the element as finally cast, which is efficient in use regardless of the form of vessel from which the liquid, such as water, enters the trap, which is easy to install, simple in its operation, and which may be manufactured at a minimum of expense.

Still other and further objects of the invention will become evident and at once suggest themselves to those skilled in the art to which the invention relates when the following specification is read in connection with the accompanying drawings, in which—

Fig. 1 represents an elevational view of the trap with arrows used to designate generally the circulatory or whirling path of the liquid from its entrance into the trap unit until its egress therefrom;

Fig. 2 is a plan view of the trap unit shown by Fig. 1 in elevation;

Fig. 3 is a sectional view taken along the section 3—3 of Fig. 1 looking in the direction of the arrows; and, Fig. 4 is also a sectional view taken along the section 4—4 of Fig. 1 also looking in the direction of the arrows.

Referring now to the drawing for a further understanding of this invention, the complete trap element comprises essentially an inlet conduit, tube, or pipe element 11 which is arranged to bend into and to connect with an enlarged main body, chamber or reservoir section 15. This reservoir section is generally bulbous or pear-shaped in its longitudinal contour. In its transverse planes the main reservoir, as will be appreciated particularly from Fig. 2 and Fig. 4, is of substantially circular cross-section, although, as can be seen from Fig. 4, the radius of the inner wall of the reservoir is greater than that of the outer wall.

The inlet section, conduit or pipe 11 is provided with one or two inlet openings, as the case may be, which are generally represented at 17 and 19. Suitable inlet tubes or pipes 21 and 23 may be appropriately fastened and connected to the threaded ends of the inlet tubes by means of the tightening nuts 25 and 27.

Suitable packing or a ground joint construction is provided interiorly of the tightening nuts 25 and 27 to connect the inlet tube or pipe 21 to the inlet 17 with a liquid tight seal, and likewise similarly to connect the inlet conduit 23 to the end or opening 19. In operation, and while draining liquid, one or the other of these inlet openings 17 and 19 is preferably closed.

In one of its preferred constructions the inlet tube 11 has its outermost edge 29 curved to merge with and into the outer wall of the bulbous or pear-shaped configuration of the main trap body or reservoir member 15. For example, the lower end of the inlet conduit or pipe 11 may be curved along a radius of curvature represented as "R", which radius also constitutes approximately that of the curvature of the left-hand side of the main reservoir member 15, for instance. The right-hand edge of the main reservoir 15 may be similarly curved so as generally to complement the outermost surface.

The inner edge of the inlet conduit or pipe 11 flattens at the point or area where it joins to the inner surface of the main bulbous or pear-shaped reservoir member 15 so as to form the dip or constriction which is indicated at 31. This constriction is shown generally in elevation by Fig. 1 and in section by Fig. 3, where the incoming liquid from the inlet conduit or tube 11 enters into the main reservoir through the dip or constriction formed between the edges 29 and 31, as shown.

The upper end of the main bulbous or pear-shaped body or reservoir member 15 is also formed by a constricted opening terminating in a threaded portion, as indicated at 35. It is customary to connect this end of the reservoir to the outlet pipe or tube 37, which is arranged to lead into a final outlet or sewer (not shown) to discharge liquid and other material passed through the trap. The outlet tube or pipe 37 is attached to the main trap section 15 by means of the fastening nut 39, which is adapted to be tightened on the screw threads 35. The usual form of ground joint is provided to prevent leakage of liquid, in well known manner, as was mentioned also for the inlet connection.

As is indicated particularly by Figs. 2 and 4, the main body or reservoir 15 is substantially circular in cross-section in all regions upward of the dip or constriction 31 where the inner edges of the reservoir and the inlet conduit pipe join. The inlet section, conduit or pipe 11 in the region immediately above the dip or constriction 31 is flattened to some extent at its inner edge while the outer edge is substantially of arcuate configuration, all as more particularly indicated by Figs. 1 and 4 especially. It thus becomes apparent, and is especially pictured by the drawings and, particularly, Fig. 1 thereof, that the semi-circular half of the confining wall of the inlet section leading into the bulbous body member which is located more remotely from the chamber formed therein merges into the semi-circular portion of the chamber adjacent its bottom along a substantially circular curve, as is indicated by the radius R shown as taken substantially within a plane approximately at the juncture of the inlet section with respect to the adjacent semi-circular wall section of the chamber formed in the body member.

Whenever liquid is drained from a suitable container or fixture (not shown) so as to enter into either of the inlets 17 or 19 formed at the upper section of the inlet conduit or pipe 11 (one opening usually being assumed to be closed when draining liquid from a source) this liquid may be assumed to flow along the paths generally designated by the arrows shown on Fig. 1. It thus becomes apparent that the entering liquid, such as water, will flow downwardly through the inlet conduit or pipe 11 and follow the circular outer contour of this inlet to enter into the main reservoir section 15. As was pointed out above, this reservoir section is somewhat of bulbous or pear-shaped character in its longitudinal direction but of substantially circular cross-section in all planes intermediate the dip or constriction 31 and the outlet tube 33, with the diameter of the circular sections progressively increasing from the lowermost section of the reservoir until it reaches a maximum in a plane slightly above the central portion thereof, as shown. The diameter of the circular sections then again progressively decrease until the outlet constriction leading to the outlet pipe 33 is reached. As above also mentioned, the reservoir 15 has a volumetric capacity which is large relative to that of the constricted section of U-shaped formation formed where the inlet conduit 11 and the reservoir section merge.

Entering liquid then tends, by virtue of centrifugal force and the velocity at which it flows down the intake conduit 11 to follow the outer circular tube or path as far as this is possible. Then, because of the circulatory path taken, the liquid tends to circulate or whirl around and around within the main reservoir unit 15 so as to pass over also the innermost surface thereof in such a way that a continued whirling motion is provided within the main reservoir section with liquid draining into the reservoir unit 15 from the supply source (not shown).

Finally, with more and more liquid coming into the trap proper from the inlet conduit 11 a certain part of the liquid drains into the overflow tube or conduit 33, after having first circulated around and around within the main reservoir section 15. The circulating or whirling action of the liquid through the main reservoir section, as indicated by the arrows, keeps washing and washing the interior of the trap in such a way that foreign substances, dirt, vermin and the like are not permitted to collect on the inner surface and any such foreign material that enters from the main supply source is caused to pass out through the overflow. The substantially uniform curvature of the body section 15 and its uniform merging into the outlet provide a constriction-free path over which the foreign substances can flow.

It is thus apparent that both the cross-sectional and the longitudinal configuration of the main reservoir section of the trap are such as to create the whirling and circulatory liquid path through the trap without the need of any mechanical assistance. At the same time it will be apparent that in draining liquid through the trap the circulating water or liquid holds the water or liquid seal in the trap, but with the final drainage of liquid from the supply source (not shown) into the intake conduit 11 it will be appreciated that finally the reduced pressure, and thus the partial vacuum created by the drainage and the circulation or whirl of liquid in the main reservoir section 15, finally draws in air or other fluid under atmospheric or greater pressure than that within the trap itself from the now empty supply source connected at either (or even both) 17 and 19. Finally in the draining operation an air bubble tends to pass around the circulating liquid in the main reservoir 15 to break the siphoning action. This at once causes the large volume of liquid heretofore contained in the main reservoir to flow in the reverse direction to that shown by the arrows below the constriction 31, whereupon it flows backwardly to form a liquid seal for the trap. This effect maintains the trap as a whole in a completely non-siphoning condition.

At the same time, the constricted opening provided by the dip section 31, which is considerably less than the cross-section of the main trap reservoir and also of much less volume, requires a minimum amount of liquid to provide the necessary seal so that there is little opportunity for evaporation of the liquid seal even in the absence of use over a considerable period of time.

Having now described the invention, what is claimed and desired to be secured by Letters Patent is the following:

1. A non-siphoning liquid seal trap for insertion in a drainage system, composed of a unitary structure comprising an inlet section and a bulbous body section, said body section being substantially symmetrical about a major axis and terminating at its upper end in a substantially centrally located uniformly curved outlet, means for establishing connection at the outlet with a discharge conduit for liquid passed through the trap, means at the inlet section for establishing connection with an inlet member for conveying liquid into the trap, said body section having a hollowed interior providing a chamber, the interior wall surface of said chamber being substantially ovoid in shape and generally circular in planes perpendicular to the major axis of the body section with the smaller end of the ovoid section being disposed downwardly, said first-named connection-establishing means also having a wall which is generally circular in planes perpendicular to the major axis and the outer wall thereof being substantially a continuation of said interior wall of said chamber, said inlet section also being generally circular in planes perpendicular to its axis and having the semi-circular half of its confining wall which is located more remote from said chamber of the curvature which merges into the semi-circular portion of the chamber adjacent its smaller end and along a substantially uniform circular curve, the opposite wall portion of said inlet section being curved to a different radius to intersect the adjacent semi-circular wall section of the chamber, the last-named intersecting sections of the inlet section wall and the chamber section wall providing a vertically constricted section to direct liquid initially along the outer wall section of the chamber and more remote from said inlet section to produce a continuously gyrating and whirling body of liquid within said chamber during liquid flow within and through the trap, the excess of liquid of the gyrating and whirling body of liquid being discharged upwardly along an obstruction-free path provided by the substantially uniform curvature of the upper chamber section so that centrifugally rejected bodies of solids which tend to follow the substantially continuous outer wall surface of said vertical section interior of said chamber are passed to the overflow, the gyrating body of liquid within the body member settling to interrupt siphoning action and to provide a liquid seal between the vertical inlet section and the chamber when liquid flow ceases in the inlet section.

2. A non-siphoning liquid seal trap for insertion in a drainage system composed of a unitary structure comprising a bulbous body section and a tubular inlet section connected thereto, said body section being substantially symmetrical about a major axis and terminating at its upper end in a substantially uniformly curved outlet port, means at the outlet for establishing connection with a discharge conduit for removing liquid passed through the trap, means at the inlet section for establishing connection with all inlet members for conveying liquid into the trap, said body section having a hollowed interior for providing a fluid holding chamber, the interior wall surface of said chamber being substantially ovoid in shape and generally circular in planes perpendicular to the major axis of the body section with the smaller end of the ovoid section being disposed downwardly, said first-named connection-establishing means also having a wall which is generally circular in planes perpendicular to the major axis and having one wall surface thereof constitute substantially a continuation of said interior wall of said chamber, said inlet section also being generally circular in planes perpendicular to its axis and having the semi-circular half of its confining wall which is located more remote from said chamber of a curvature which merges into the semi-circular portion of the chamber adjacent its smaller end and along a substantially uniform circular curve, the opposite wall portion of said inlet section being curved to a different radius to intersect the adjacent semi-circular wall section of the chamber, the last-named intersecting sections of the inlet section wall and the chamber section wall providing a vertically constructed section at the lower portion of the bulbous body section to direct liquid initially along the outer wall section of the chamber more remote from said inlet section in order that liquid when flowing through the trap shall be continuously gyrating and whirling within the bulbous body while permitting excess liquid discharged upwardly along an obstruction-free path provided by the substantially uniform curvature of the upper chamber section merging into the outlet port so that centrifugally rejected bodies of solids which tend to follow the substantially continuous curvature of the outer wall surface of the bulbous body are passed to the overflow and so that the gyrating body of liquid within the body member will settle to interrupt siphoning action and simultaneously provide a liquid seal between the vertical inlet section and the bulbous member when liquid ceases to flow into the trap inlet section.

3. A non-siphoning liquid seal trap for insertion in a drainage system, composed of a unitary structure comprising a tubular inlet section and a bulbous body section into which the inlet section is merged, said body section being substantially symmetrical about a major axis and terminating at its upper end in a substantially centrally located uniformly curved outlet port for establishing connection of the outlet with a discharge conduit for liquid passed through the trap, said inlet section having a connection establishing section to connect with an inlet conduit for conveying liquid into the trap, said body section having a hollowed interior providing a chamber of substantially like configuration to the bulbous body, the interior wall surface of said chamber being substantially ovoid in shape and generally circular in planes perpendicular to the major axis of the body section with the smaller end of the ovoid section being disposed downwardly, said first-named connection-establishing port also having a wall which is generally circular in planes perpendicular to the major axis of the bulbous body section and being substantially a continuation of said interior wall of said chamber, said inlet section also being generally circular in planes perpendicular to its axis and having the semi-circular half of its confining wall which is located more remote from said chamber of a curvature which merges substantially uniformly into the outer wall of the chamber in the region of its smaller end, the opposite wall portion of said inlet section being curved to a different radius of curvature corresponding substantially to the curvature of the inner wall of the bulbous body member, the last-named intersecting portions of the tubular inlet section wall and the bulbous chamber section wall providing an opening which is a constricted U-shaped section of a cross-sectional area in the plane of intersection which is less than the cross-sectional area of each of the inlet conduit and the bulbous body member at other planes so that liquid initially directed into the chamber flows along such a path within the bulbous member as to produce a continuously gyrating and whirling body of liquid therein during liquid flow within and through the trap and so that excesses of liquid forming the gyrating and whirling mass are discharged upwardly along an obstruction-free path provided by the substantially uniform curvature of the upper chamber section and centrifugally rejected bodies of solids which tend to follow the substantially continuous outer wall surface of said vertical section interiorly of said chamber are simultaneously passed to the overflow, the gyrating body of liquid within the body member settling to interrupt siphoning action and to provide a liquid seal between the vertical inlet section and the chamber when liquid flow ceases in the inlet section.

FRED M. DRESSEL.

REFERENCES CITED

The following references are of record in the file of this patent:

UNITED STATES PATENTS

| Number | Name | Date |
|---|---|---|
| D. 44,404 | Hadden | July 29, 1913 |
| 499,815 | Williams | June 20, 1893 |
| 1,112,437 | Cody | Oct. 6, 1914 |